United States Patent
Blandford

(10) Patent No.: US 7,182,044 B1
(45) Date of Patent: Feb. 27, 2007

(54) ANIMAL CONTROL ARRANGEMENT

(76) Inventor: January Blandford, 134 Seawall Rd., Rancho Palos Verdes, CA (US) 90275

( * ) Notice: Subject to any disclaimer, the term of this patent is extended or adjusted under 35 U.S.C. 154(b) by 0 days.

(21) Appl. No.: 11/389,328

(22) Filed: Mar. 27, 2006

Related U.S. Application Data

(63) Continuation of application No. 10/347,611, filed on Jan. 21, 2003, now Pat. No. 7,040,256.

(51) Int. Cl.
*A01K 27/00* (2006.01)
(52) U.S. Cl. ..................................... 119/796
(58) Field of Classification Search ............... 119/769, 119/792, 794, 795, 796, 797, 798, 770, 771
See application file for complete search history.

(56) References Cited

U.S. PATENT DOCUMENTS

| | | | | |
|---|---|---|---|---|
| 4,879,972 A | * | 11/1989 | Crowe et al. ............... | 119/792 |
| 4,892,063 A | * | 1/1990 | Garrigan ..................... | 119/795 |
| 5,632,234 A | * | 5/1997 | Parker ........................ | 119/795 |
| 5,701,848 A | * | 12/1997 | Tozawa ...................... | 119/797 |
| 5,852,988 A | * | 12/1998 | Gish .......................... | 119/795 |
| 5,901,668 A | * | 5/1999 | Goodger, Sr. ............... | 119/795 |
| 6,237,539 B1 | * | 5/2001 | Sporn ......................... | 119/795 |
| 6,247,428 B1 | * | 6/2001 | Mireles ...................... | 119/795 |
| 6,273,029 B1 | * | 8/2001 | Gish .......................... | 119/792 |
| 6,439,168 B1 | * | 8/2002 | Maglich et al. ............. | 119/795 |
| 6,530,131 B1 | * | 3/2003 | Hopkins ...................... | 24/300 |
| 6,539,897 B1 | * | 4/2003 | Dossenback ................ | 119/795 |
| 6,626,132 B1 | * | 9/2003 | Mann ......................... | 119/795 |

* cited by examiner

*Primary Examiner*—T. Nguyen
(74) *Attorney, Agent, or Firm*—Cislo & Thomas LLP

(57) ABSTRACT

An animal control arrangement in which there is provided a plurality of leashes which may be attached to the collars of animals to be controlled while walking, exercising, training or the like and which reduces the likelihood of the leashes becoming tangled.

3 Claims, 5 Drawing Sheets

ANIMAL CONTROL ARRANGEMENT

REFERENCE TO RELATED APPLICATIONS

This application is a continuation of my invention in application Ser. No. 10/347,611 now U.S. Pat. No. 7,040,256.

FIELD OF THE INVENTION

This invention relates to the animal control art and more particularly to an anti-tangling leash arrangement for controlling a plurality of animals, such as dogs, during the walking, exercising, training or other activities wherein two or more animals must be simultaneously controlled.

DESCRIPTION OF THE PRIOR ART

A major problem that often arises when one person is required to control simultaneously a plurality of animals, such as dogs, during the walking, exercising, training or the like of the plurality of dogs is that the leashes which are attached to the dogs often become tangled and twisted together as the dogs tend to move in separate and erratic paths. Many cities in the United States have leash laws that require that dogs be restrained on a leash generally specified to be no more than a particular length, such as six feet in length, when in public. As such, the dogs cannot generally be allowed to roam freely, except in specific designated public areas which are generally designated "dog parks". Unless a person is fortunate enough to live close to such a dog park or live in an area where there are no leash laws, most of the time that one person is required to walk, train, exercise or the like simultaneously a plurality of dogs in public, each of the dogs must be restrained on the required leash.

During such simultaneous control of a plurality of dogs by one person, it is generally desired that each of the leashes be held in one hand, leaving the other hand free for other activities.

There have heretofore been proposed various arrangements for the control of a plurality of dogs by one person during the walking, exercise, training or the like of the dogs while maintaining each dog on a separate leash with the desired objective of preventing the entanglement of the leashes. Such prior art arrangements have not always proven to be satisfactory in many applications. Therefore, there has long been a need for a control arrangement that allows one person to control simultaneously a plurality of animals, such as dogs, during the exercise, walking, training or the like thereof while such animals are on individual leashes and which minimizes the entangelment of the leashes.

SUMMARY OF THE INVENTION

Accordingly, it is an object of the present invention to provide an improved animal control arrangement.

It is another object of the present invention to provide an animal control arrangement useful in the application of one person simultaneously controlling a plurality of animals.

It is yet another object of the present invention to provide a multiple leash arrangement for allowing one person to control simultaneously a plurality of animals while each of the animals is restrained on an individual leash.

It is yet another object of the present invention to provide a multiple leash arrangement for allowing one person to control simultaneously a plurality of animals while each of the animals is restrained on an individual leash and which reduces the occasions of the tangling of the leashes during the walking, exercising, training or the like of the animals.

The above and other objects of the present invention are achieved, according to a preferred embodiment thereof by providing a body member having a plurality, such as two, (though more may be desired in many applications) of substantially rigid mounting portions in a spaced apart array. Each of said plurality of mounting portions has a preselected geometrical configuration such as bone end shaped round, quadrilateral, polygonal or other desired shapes. Each of the mounting portions has peripheral walls defining a central cavity extending therethrough and the peripheral walls have a predetermined geometrical configuration in cross section. The body member also has a rigid joining portion for connecting the mounting portions in the spaced apart array.

In this embodiment of the present invention there is also provided a plurality of flexible, resilient, coil spring like members having a cental cavity therethrough defined by the coils of the spring like member and one of the plurality of flexible, resilient, coil spring like members is movably connected to each of the rigid mounting portions for sliding movement on peripheral walls thereof. There are a plurality of leash members, each of the plurality of leash members having a handle end and an attachment end. One of the plurality of leash members is threaded through the tube like members. The attachment end of each of the leash members is spaced away from the body member in a first direction and the handle end of each of the leash members extends in a second direction away from the body member whereby each of said attachment ends of the plurality of leash members may be attached to an animal, such as a dog, to be controlled and the handle end of each of leash members may be held by the person controlling the animal.

A restraining member is coupled to each of said plurality of leash members intermediate the attachment end thereof and said handle end thereof for preventing the leash members from moving out of said flexible, resilient, coil spring like member in a direction toward the handle end thereof and allowing said leash member to slide through the flexible, resilient, coil spring like member in a direction toward said attachment end thereof. For the condition of an animal such as a dog attached to the attachment end of the leashes and the person controlling the dog has grasped the handle end of the leashes, the restraining member is in abutment with the body member and preventing the leashes from movement toward the handle end thereof and defining a predetermined separation of the animals from the body member.

It has been found that this embodiment of the animal control arrangement reduces the tendency of the leashes to become entangled or twisted together as the animals tend to walk and wander in various directions during the walk, exercise, training or the like which the person controlling the animals desires the animals to do.

The mounting portions of the body member may be made in any desired geometrical configuration as long as there are peripheral walls defining a cavity therethrough. Thus the mounting members may be in the form of a bone end, a ring, a quadrilateral such as a square, diamond, trapezoid, parallelogram, etc. or may be in the form of any desired other polygon. The mounting portions of the body member may also be in the form of a ring, an oval or other curvilinear configuration.

The cross sectional configuration of the peripheral walls of the mounting members may be, for example, tubular, solid rod like, rectangular or square ribbon like or any other desired geometrical shape. Similarly, the joining portion may have a cross sectional configuration of a single tube like, rod like, ribbon like or any other desired configuration. The joining portion may be split into two or more spaced apart sections as may be desired for certain conditions.

In other embodiments of the present invention. the flexible, resilient, coil spring like members may be replaced by tubular members.

The exact physical laws which explain why these embodiments of the invention act to reduce the tendency of the leashes to become tangled or entwined is not known.

The leashes may be conventional fixed length leashes or they may be the extendible type of leash in which a controller is provided with a spring loaded reel upon which the leash is wound and a handle portion for holding the controller. Operable buttons selectively allow the leash to extend from the controller against the spring tension and be retracted into the controller by the spring action as desired.

BRIEF DESCRIPTION OF THE DRAWING

The above and other embodiments of the present invention may be more fully understood from the following detailed description taken together with the accompanying drawing and in which similar reference characters refer to similar elements throughout and in which.

DESCRIPTION OF THE PREFERRED EMBODIMENTS

Figure 1:
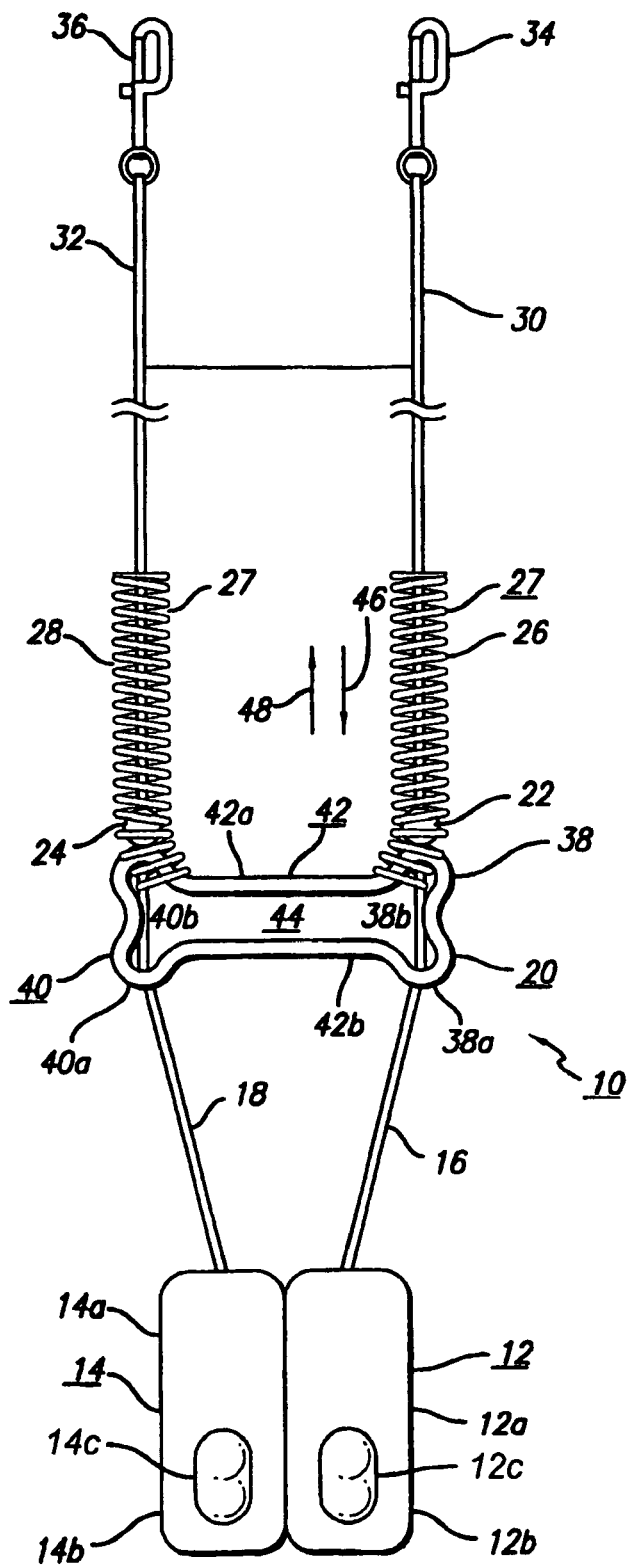
FIG. 1 illustrates a preferred embodiment of the present invention.

Referring now to the drawing there is shown in FIG. 1 a preferred embodiment of the present invention generally designated 10. The embodiment 10 is provided with a pair of extendible leash controllers 12 and 14 which may be fixedly coupled together. The controllers 12 and 14 have a spring loaded reel portion 12a and 14a, respectively, and a handle portion 12b and 14b respectively. A leash 16 extends from the spring loaded reel portion 12 and a leash 18 extends from the reel portion 14a. The leashes 16 and 18 extend against the tension of the spring in the controllers and are retracted into the respective reel portion by the action of the spring loaded reel. The controllers 12 and 14 may be one of the many of the types of extendable leash arrangements such as those sold under the trademark TOP PAW® by Pacific Coast Distributing, Inc., P.O. Box 84613, Phoenix, Ariz. 85071, or those sold under the trademark SPOTLIGHT® BY Ruff & Tumble Company, 21755 Ventura Blvd., Woodland Hills, Calif. 91364, or those sold under the trademark FLEXI BY Flexi ISA, 147 Circle Freeway, Cincinnati, OH 45246 and are useful in the practice of this embodiment of the present invention. The handle portions 12b and 14b may, for purposes of the description of the present invention be considered the handles of the leashes 16 and 18, respectively. Buttons 12c and 14c are utilized to control the extension and retraction of the leashes 16 and 18, respectively in a manner well known in the art and may be individually operated or jointly operated by a rocker button (not shown). While two controllers 12 and 14 are shown on FIG. 1, more than two such controllers may be conveniently joined together for appropriate operation according to the principles of the present invention.

The leashes 16 and 18 extend past a body member 20, through retainers 22 and 24 which are fixedly coupled to the leashes 16 and 18 respectively, through a separator generally designated 27 which, in the embodiment 10 are flexible, resilient, coil spring like members 26 and 28, respectively, and terminate at the attachment ends 30 and 32, respectively, which are connected to swivel snap fasteners 34 and 36. The swivel snap fasteners may be attached to the collars of the animals to be controlled.

The body member 20 has a pair of substantially rigid mounting portions 38 and 40 in a fixed spaced apart array and are maintained in this fixed spaced apart array by a rigid joining portion 42. In the embodiment 10 the body member 20 is in the form of a "bone" and the mounting portions 38 and 40 are in the form of "bone ends". As described below in connection with FIG. 4, the body member useful in various embodiments of the present invention may take a variety of configurations.

Each of the mounting portions 38 and 40 have a preselected shape with a preselected geometrical configuration. The mounting portions 38 and 40 have peripheral walls 38a and 40a defining a cavity 38b and 40b. The mounting portions 38 and 40 may have any desired cross sectional configuration as described below in connection with FIG. 5.

The rigid joining member 42 is, in the embodiment 10, a pair of spaced apart joining sections 42a and 42b which may also have any desired cross sectional configuration as described below in connection with FIGS. 5A through 5D.

The flexible, resilient, coil spring like members 26 and 28 are mounted on the mounting portions 38 and 40, respectively, for sliding motion on the peripheral walls 38a and 40a, respectively, but are preferably retained by their configuration from entering the space 44 between the joining sections 42a and 42b.

The retaining members 22 and 24 are, as noted above, fixedly coupled to the leashes 16 and 18, respectively, and abut against the peripheral walls 38a and 40a, respectively, thereby restraining the leashes 16 and 18 from further retraction by the reel towards the handles 12b and 14b, respectively as indicated by the arrow 46. The retainers 22 and 24 are sized so as to be freely movable through the flexible, resilient, coil spring like members 26 and 28, respectively, in the direction of the attachment ends 30 and 32 as indicated by the arrow 48. Such movement in the direction of the arrow 48 is accomplished by selectively releasing the buttons 12c and/or 14c allowing the animals (not shown) connected to the snap swivels 34 and 36 to pull the leashes 16 and 18 as far out as the person controlling the animals desires.

Figure 2:
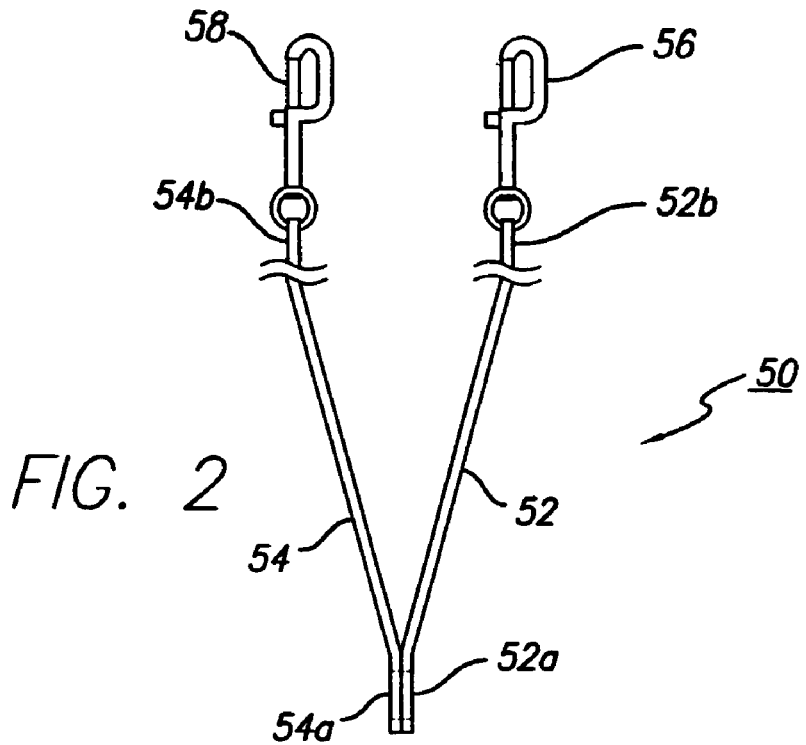
FIG. 2 illustrates a multiple leash useful in the practice of the present invention.

In other embodiments of the present invention it may be desired to utilize fixed length leashes. FIG. 2 illustrates the use of fixed length leashes in an embodiment 50 of the present invention. The pair of leashes 52 and 54 may be conventional leashes having handle ends 52a and 54a and attachment ends 52b and 54b to which are connected snap swivels 56 and 58. The body member, retainer and flexible, resilient, coil spring like members have been omitted from FIG. 2 for clarity. If desired, the handle ends 52a and 54a may be coupled together such as by sewing, gluing, or the like.

Figure 3:
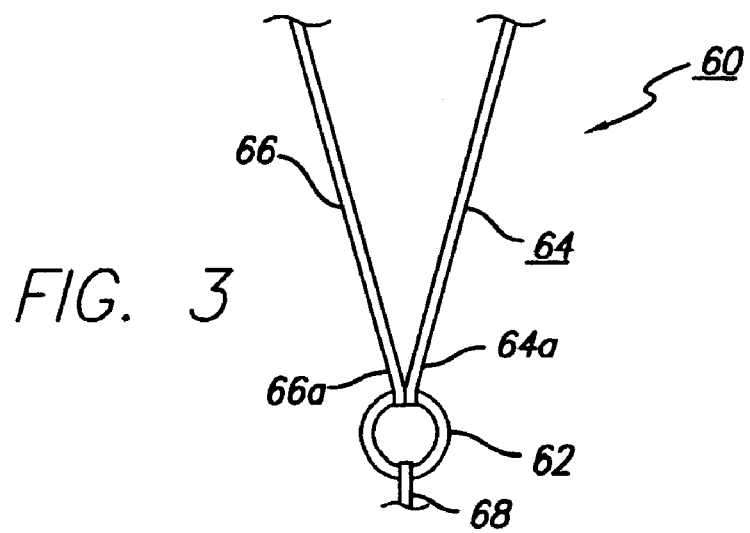
FIG. 3 illustrates another multiple leash useful in the practice of the present invention.

FIG. 3 illustrates another embodiment of the present invention generally designated 60 which is similar to the embodiment 50 except that a ring member 62 is utilized to provide connection of the handle end 64a and 66a of leashes 64 and 66, respectively. A separate handle 68 is also connected to the ring member 62 and thus may provide a more comfortable handle for grasping by the person controlling the animals. The body member, retainer and flexible, resilient, coil spring like members have been omitted from FIG. 3 for clarity.

Figure 4A:
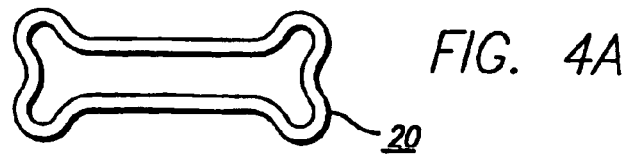
FIGS. 4A through 4I illustrate various geometrical configurations of the body member useful in the practice of the present invention.

FIGS. 4A through 4I illustrate various configurations of the body members which may be advantageously utilized in the practice of the present invention. The shapes and configurations as shown in FIGS. 4A through 4I are only examples: other configurations may equally well be utilized and the present invention contemplates any configuration of body member having the basic characteristecs as described herein. FIG. 4A shows the "bone shaped" body member 20 as described above in connection with embodiment 10. Any of the mounting portions shown in FIGS. 4A through 4B may be utilized with any of the joining portions shown as may be desired for different applications.

Figure 4B:
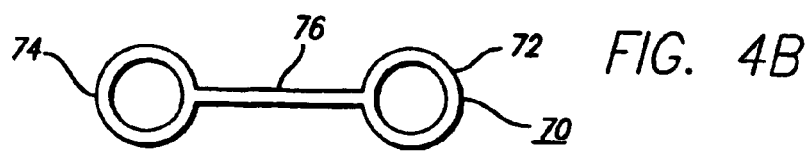

FIG. 4B shows a body member 70 having toroidal shaped mounting portions 72 and 74 with a single joining portion 76.

Figure 4C:
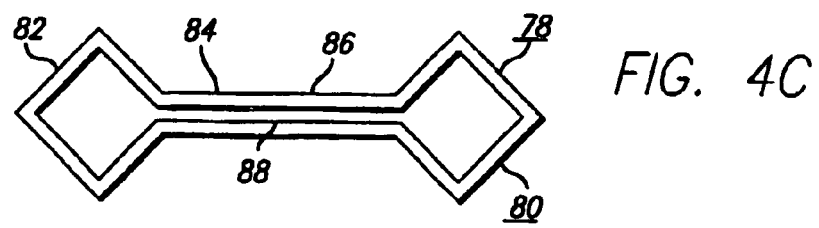

FIG. 4C shows a body member 78 having quadrilateral diamond shaped mounting portions 80 and 82 with a joining portion 84 having two spaced apart sections 86 and 88.

Figure 4D:
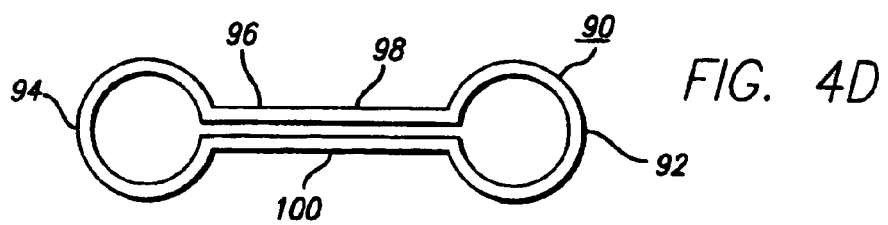

FIG. 4D shows a body member 90 having curvilinear oval shaped mounting portions 92 and 94 with a joining portion 96 having two spaced apart sections 98 and 100. The long axis of the ovals mounting portions 92 and 94 are perpendicular to the joining member 96.

Figure 4E:
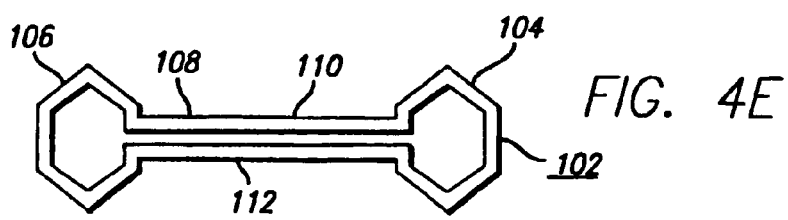

FIG. 4E shows a body member 102 having polygonal hexagonal shaped mounting portions 104 and 106 with a joining portion 108 having two spaced apart sections 110 and 112.

Figure 4F:
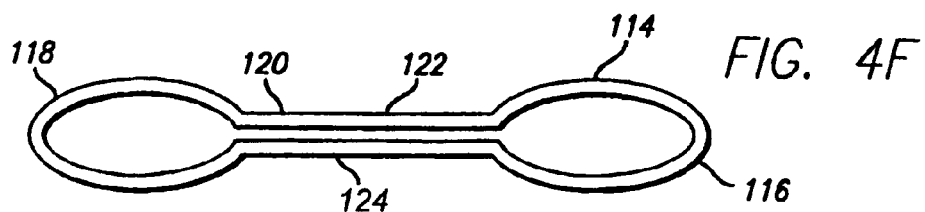

FIG. 4F shows a body member 114 having curvilinear oval shaped mounting portions 116 and 118 with a joining portion 120 having two spaced apart sections 122 and 124. The long axis of the ovals mounting portions 116 and 118 are substantially parallel to the joining member 120.

Figure 4G:
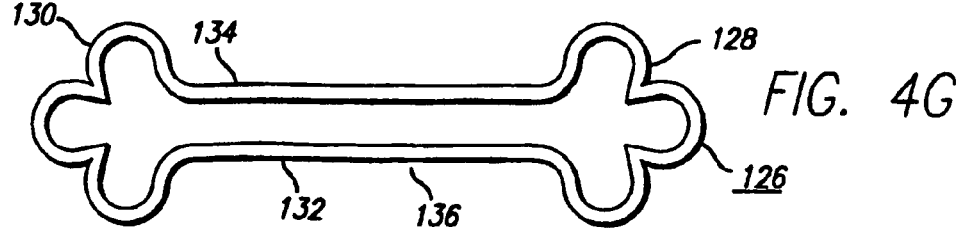

FIG. 4G shows a body member 126 having curvilinear "clover leaf" shaped mounting portions 128 and 130 with a joining portion 132 having two spaced apart sections 136 and 134.

Figure 4H:
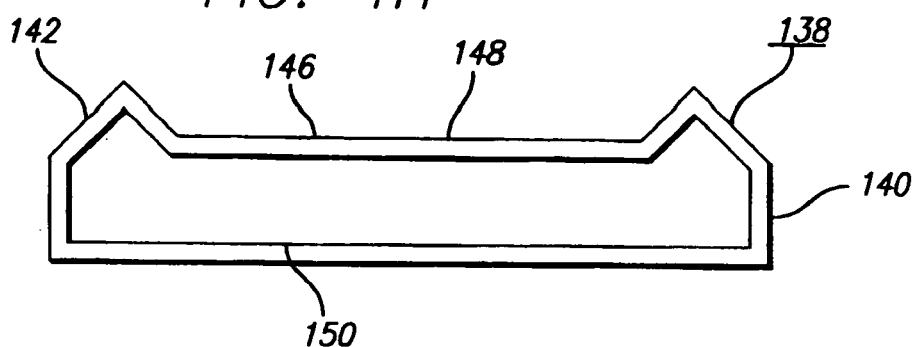

FIG. 4H shows a body member 138 having irregular polygonal shaped mounting portions 140 and 142 with a joining portion 146 having two spaced apart sections 148 and 150.

Figure 4I:
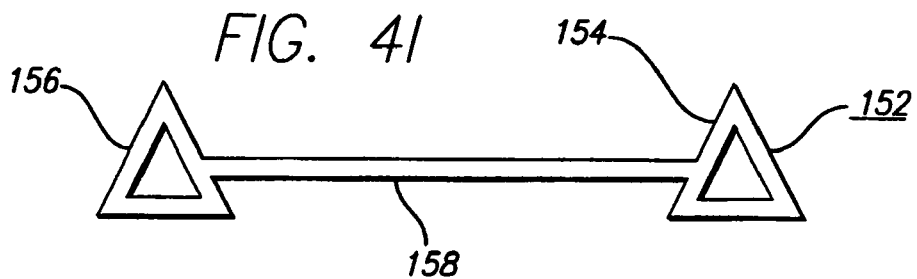

FIG. 4I shows a body member 152 having polygonal triangular shaped mounting portions 154 and 156 with a single joining portion 158.

Any of the above described body members may be utilized in any of the embodiments of the present invention such as embodiments 10, 50 and 60 described above and embodiment 200 described below in connection with FIG. 8.

Figure 5A:
FIGS. 5A through 5D illustrate various cross sectional configurations of the peripheral walls of the mounting portion and the joining portion of the body member useful in various embodiments of the present invention.
Figure 5B:
Figure 5C:
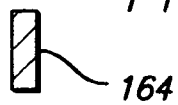
Figure 5D:

FIGS. 5A through 5D illustrate various cross sectional configurations that may be utilized in the fabrication of any or all portions of the body member utilized in the practice of the present invention. The mounting portions of the body member may have the same cross sectional configurations as the joining portion or they may be different. FIG. 5A shows a tube like cross sectional configuration as indicated at 160. FIG. 5B shows a solid rod like cross sectional configuration as indicated at 162. FIG. 5C shows a rectangular ribbon like cross sectional configuration as indicated at 164. FIG. 5D shows a square ribbon like cross sectional configuration as indicated at 166. Other cross sectional configurations may be utilized as desired.

Figure 6:
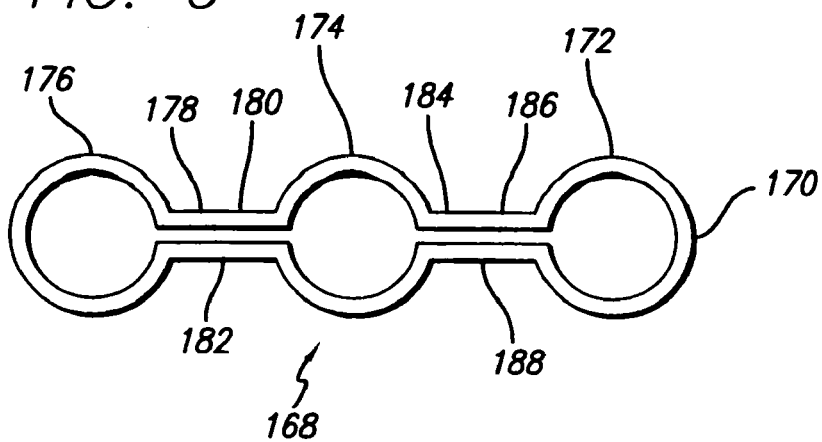
FIG. 6 illustrates another body member useful in the practice of the present invention.

The present invention is not limited to arrangements for controlling two animals. That is, the structure taught herein may be adopted to control any number of animals. As noted above, more than two controllers may be fixed together so as to allow controlling of three dogs on leashes. Similarly, the multiple leash arrangements shown on FIGS. 2 and 3 may be modified by adding additional fixed length leashes as may be desired. The body member for such more than two leash arrangement applications may be modified so as to have three or more mounting portions, the number of mounting portions corresponding to the number of leashes. FIG. 6 illustrates an embodiment generally designated 168 of a body member 170 having three mounting portions 172, 174 and 176. A joining portion 178 with two sections 180 and 182 join mounting portions 176 and 174 and joining portion 184 with sections 186 and 188 join mounting portions 174 and 172. The body member 170 may be provided with separator members at each mounting portion and retaining members attached to the leashes as inserted through the separator members as described above to allow control of three animals. The body member may be expanded to include as many mounting portions more than three as desired for controlling any desired number of animals.

Figure 7:
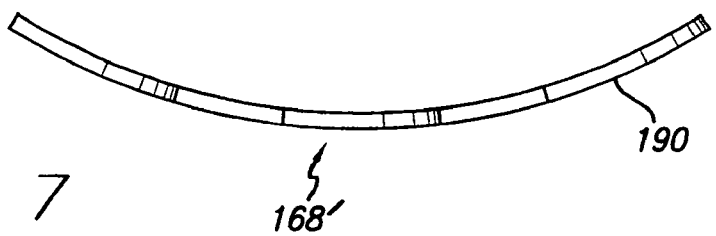
FIG. 7 illustrates another body member useful in the practice of the present invention; and, FIG. 8 illustrates another embodiment of the present invention.

The body members utilized in the present invention may have the mounting portions lie in the same plane as the joining portion or the body member may be in an arcuate configuration. FIG. 7 illustrates an embodiment 168' of a three mounting portion body member similar to the body member 170 described above and wherein the entire body member is in an arcuate configuration. Any of the body members described above may also be fabricated and used in an arcuate configuration or any other non-planar arrangement.

Figure 8:
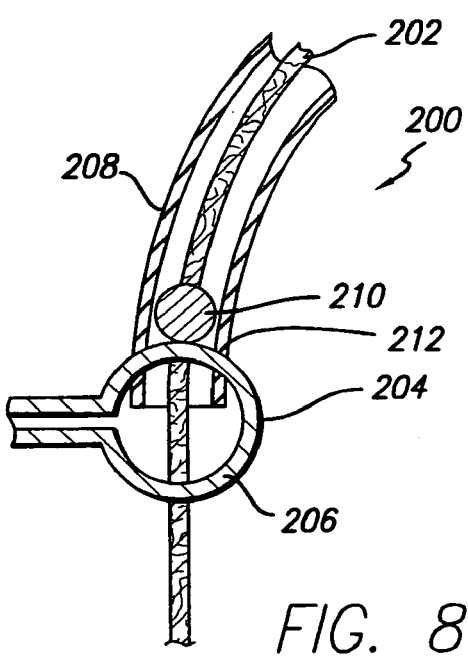

FIG. 8 illustrates a partial cross sectional view of another embodiment of the present invention generally designated 200. In the embodiment 200, which may be similar to the emboiment 10 described above, there is provided a leash, 202 which extends past a mounting portion 206 of a body member 204 and be provided with a retainer 210 fixed thereon. The separator member 208 is in the form of a rigid walled, curved tubular member and the separator member 208 is slidingly mounted on the mounting portion 206 which extend through an aperture 212. The separator member may also be a flexible walled tube like member as may be desired for particular applications. The operation of the embodiment 200 is similar to the operation of the embodiment 10 described above. Other configurations of a separator member may be utilized as desired to provide the desired functions thereof.

From the above it can be seen that there has been provided an improved animal control arrangement which reduces the occasions which the leashes to which the animals to be controlled are attached become tangled. Those skilled in the art may find many variations and adaptations of the present invention and the appended claims are intended to cover all such variations and adaptations falling within the scope and sprit thereof.

The invention claimed is:

1. An improved animal control arrangement adapted to provide simultaneous control of a plurality of animals by a person controlling the animals and comprising, in combination:
   a body member having a plurality of spaced apart mounting portions, and said body member having a joining portion for connecting said mounting portions, each of said mounting portions having mounting portion receiving apertures therethrough;
   a plurality of separator members, each of said separator members is in a form of a tubular member, wherein each of said separator members is slidingly mounted through each of said mounting portion receiving apertures for sliding movement thereon;
   a plurality of leash members, each of said plurality of leash members having a handle end and an attachment end, each one of said plurality of leash members threaded through one of said tubular member of said separator members, whereby each of said attachment ends of said plurality of leash members may be attached to an animal to be controlled and said handle end of each of said leash members may be held by the person controlling the animals; and
   a restraining member coupled to each of said plurality of leash members intermediate said attachment end thereof and said handle end thereof and each of said restraining members having a first condition for preventing said leash members from moving out of said restraining members from moving out of said tube like member in directions toward said handle end thereof and a second condition for allowing said leash members to slide through said tubular member of said separator members in directions toward said attachment end thereof.

2. The arrangement defined in claim 1, wherein said separator members are rigid walled tube like members.

3. The arrangement defined in claim 1, wherein said separator members are flexible walled tube like members.

* * * * *